US008844645B2

(12) United States Patent
Hall et al.

(10) Patent No.: US 8,844,645 B2
(45) Date of Patent: Sep. 30, 2014

(54) AERATOR HOLE SPACING CONTROL (75) Inventors: Stanley K. Hall, Godwin, NC (US);
Bradley P. Aldridge, Raleigh, NC (US);
Shane D. Simon, Cascade, IA (US)

(73) Assignee: Deere & Company, Moline, IL (US)

( * ) Notice: Subject to any disclaimer, the term of this patent is extended or adjusted under 35 U.S.C. 154(b) by 442 days.

(21) Appl. No.: 13/245,506

(22) Filed: Sep. 26, 2011

(65) Prior Publication Data
US 2013/0075117 A1 Mar. 28, 2013

(51) Int. Cl.
*A01B 45/00* (2006.01)
*A01B 45/02* (2006.01)

(52) U.S. Cl.
CPC .................................. *A01B 45/023* (2013.01)
USPC .......................................... 172/21; 172/125

(58) Field of Classification Search
USPC ............................................ 172/21, 22, 125
See application file for complete search history.

(56) References Cited

U.S. PATENT DOCUMENTS

| 2,800,066 | A | * | 7/1957 | Cohrs et al. | 172/22 |
|---|---|---|---|---|---|
| 3,224,512 | A | * | 12/1965 | Alexander | 173/19 |
| 3,834,464 | A | * | 9/1974 | Carlson et al. | 172/22 |
| 4,602,687 | A | * | 7/1986 | Hansen | 172/22 |
| 4,645,012 | A | * | 2/1987 | Hansen et al. | 172/22 |
| 4,753,298 | A | * | 6/1988 | Hansen et al. | 172/22 |
| 4,941,416 | A | * | 7/1990 | Faulring | 111/102 |
| 5,101,745 | A | * | 4/1992 | Podevels et al. | 111/127 |
| 5,119,744 | A | * | 6/1992 | Comer | 111/127 |
| 5,207,168 | A | * | 5/1993 | Comer | 111/200 |
| 5,398,767 | A | * | 3/1995 | Warke | 172/21 |
| 8,061,282 | B2 | * | 11/2011 | Borland | 111/89 |
| 2002/0189825 | A1 | * | 12/2002 | Livingstone | 172/21 |
| 2011/0005783 | A1 | * | 1/2011 | Livingstone | 172/1 |

FOREIGN PATENT DOCUMENTS

| EP | 0861578 A1 | 9/1998 |
|---|---|---|
| EP | 2260686 A1 | 12/2010 |
| WO | 2004043132 A2 | 5/2004 |

OTHER PUBLICATIONS

EP Search Report dated Mar. 18, 2014 (4 pages).

* cited by examiner

*Primary Examiner* — Jamie L McGowan (57) ABSTRACT

An aerator hole spacing control with a hydrostatic traction drive including a pump and a plurality of wheel motors, a control arm mounted on a control shaft of the pump that controls the direction and the speed of the pump, and a cam follower on the control arm that contacts a cam surface having a minimum coring speed position, a maximum coring speed position, and a transport position. The cam surface may be linked to an operator speed control that moves the cam surface to determine where the cam follower contacts the cam surface to change the speed of the pump anywhere between the minimum coring speed position and the maximum coring speed position without stopping the pump.

16 Claims, 7 Drawing Sheets

FIG. 7

AERATOR HOLE SPACING CONTROL

FIELD OF THE INVENTION

This invention relates to aerators for aerating ground surfaces. More specifically, the invention relates to a walk-behind aerator with a hole spacing control that an operator may use to change the hole spacing while the aerator is moving.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have tines that repeatedly penetrate the ground surface, forming a plurality of holes so that the ground surface is aerated, to improve growth of the grass or other material and enhance the condition of the surface for playing purposes.

Aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

An operator may need to change hole spacing of an aerator due to variable ground conditions, including variations in turf, soil, moisture and temperature over time and between different locations. Most aerators have a drive system that moves the aerator at a designated speed while rotating the coring head at a translated RPM, and thereby produces a pattern that approximates the selected spacing. For example, hole spacing settings can be and typically are set anywhere between 0 and 6 inches.

However, existing walk-behind aerators have traction drives that must be stopped so that the aerator is stationary before an operator can increase or decrease the hole spacing, or that cannot change the hole spacing in either direction while the aerator is moving. For example, to increase or decrease the hole spacing, the operator may be required to return the operator presence/traction control bail to the neutral position to stop the aerator traction drive, and then adjust hole spacing using shift levers or other controls that may be outside the operator station.

An aerator hole spacing control is needed that an operator can use to increase or decrease the hole spacing without stopping the aerator traction drive. A hole spacing control is need that an operator can use from the operator station while the aerator traction drive continues to move the aerator forward and the coring head continues to operate.

SUMMARY OF THE INVENTION

An aerator hole spacing control for an aerator having a hydrostatic traction drive and at least three wheels, a neck extending therefrom with an upwardly and forwardly extending handle assembly including operator controls so that an operator may walk ahead of the aerator and steer the aerator by using the handle assembly to pivot one of the wheels about a vertical pivot axis. A coring head may be mounted on the rear of the aerator carrying a plurality of tine assemblies that reciprocate up and down by rotation of a crankshaft; each tine assembly having a plurality of coring tines that are driven into the ground and produce holes for the purpose of aerating the turf.

An operator actuated speed control lever may be provided on the handle assembly. A pivoting speed control cam is connected to the speed control lever and has a curved cam surface with a variable radius. A control arm with a cam follower is mounted to a hydrostatic pump control shaft of the traction drive. The control arm moves the cam follower into contact with the curved cam surface of the pivoting speed control cam and places the hydrostatic pump in a position to operate the traction drive between a minimum coring speed and a maximum coring speed to change the hole spacing while the aerator moves forward and the coring head is operating based on where the cam follower contacts the speed control cam along the variable radius of the curved cam surface.

DESCRIPTION OF THE PREFERRED EMBODIMENT

Figure 1:
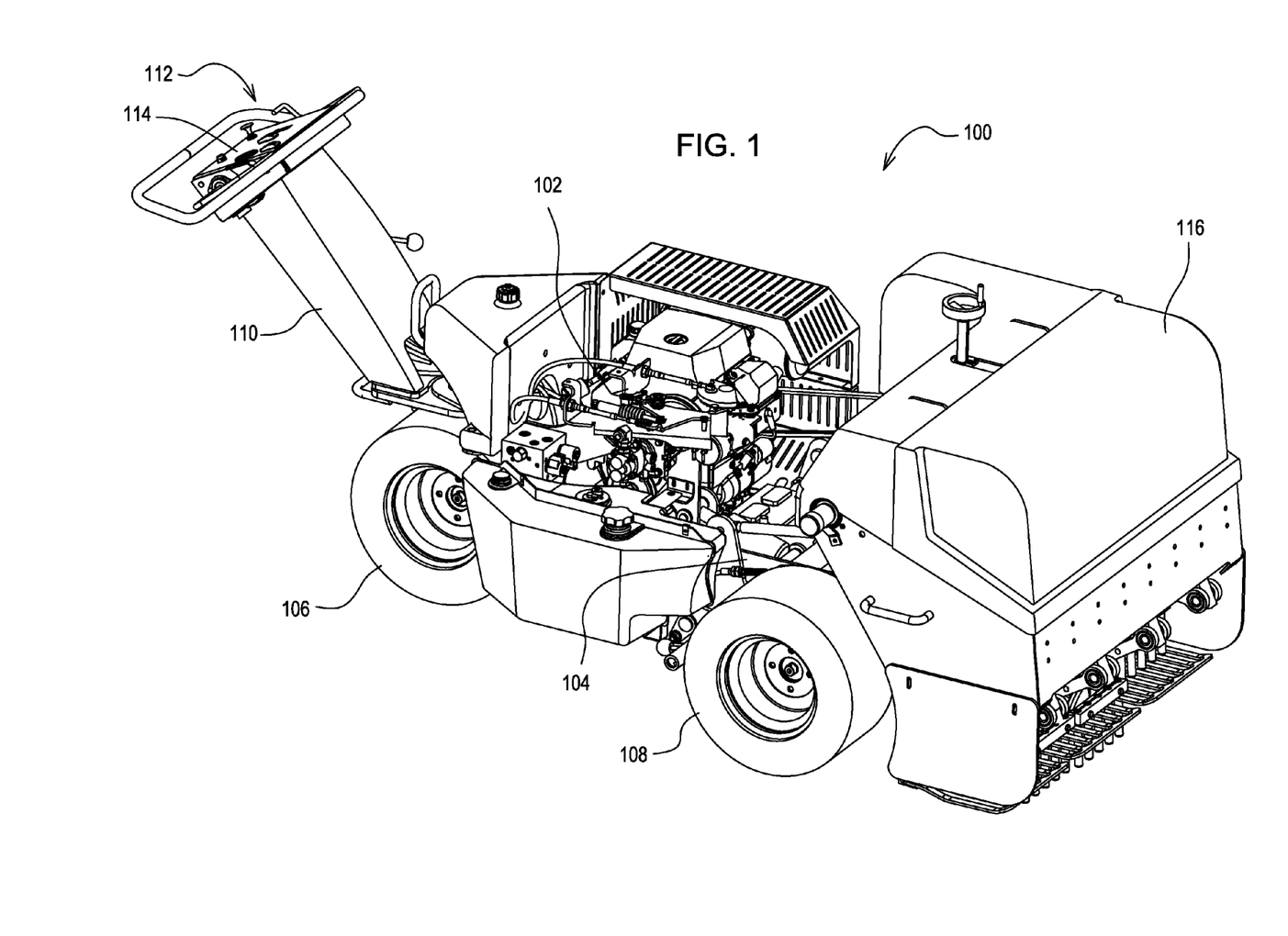
FIG. 1 is a perspective view of an aerator with an aerator hole spacing control according to a preferred embodiment of the invention.
Figure 2:
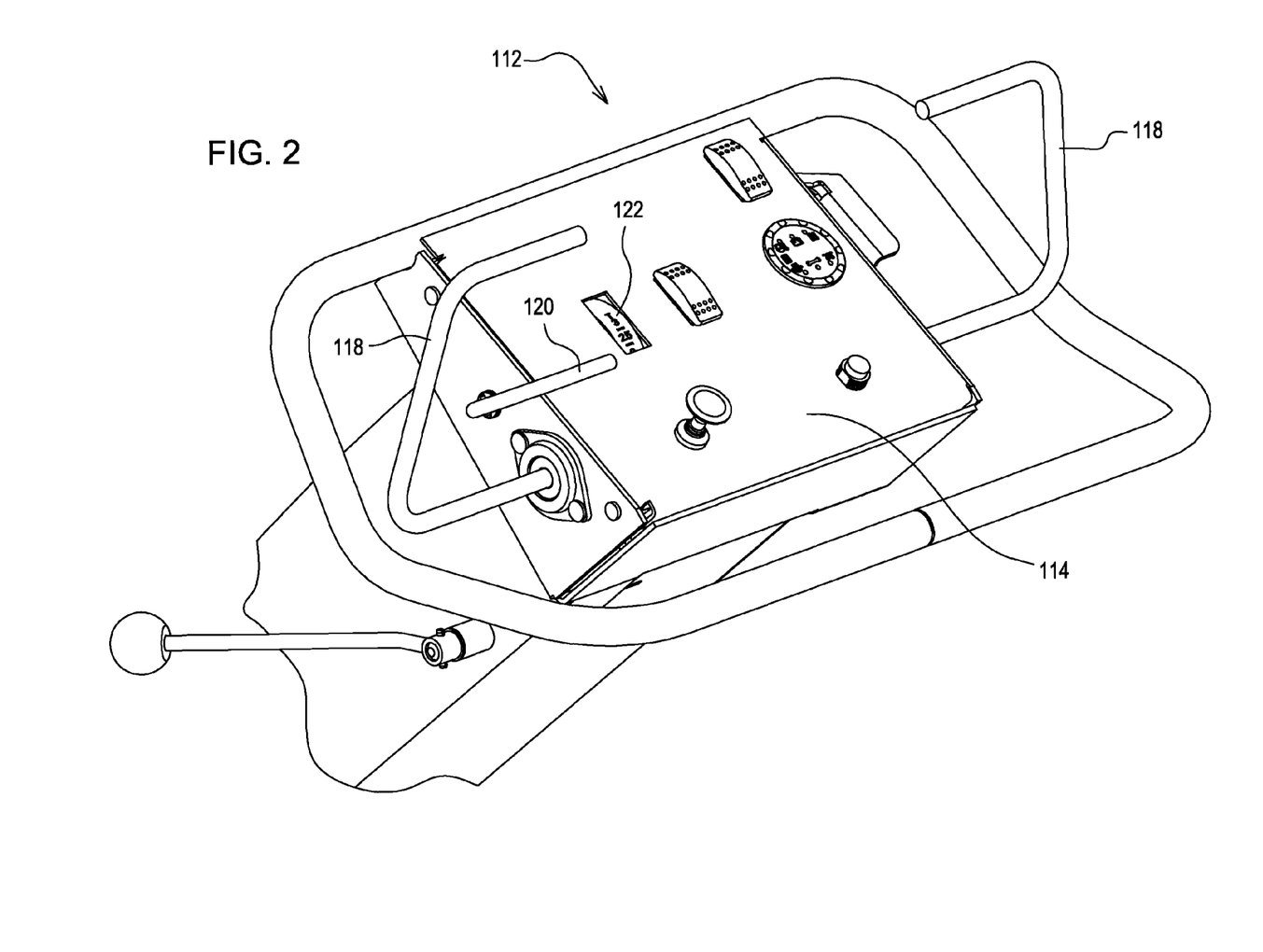
FIG. 2 is a perspective view of operator controls for an aerator with an aerator hole spacing control according to a preferred embodiment of the invention.
Figure 3:
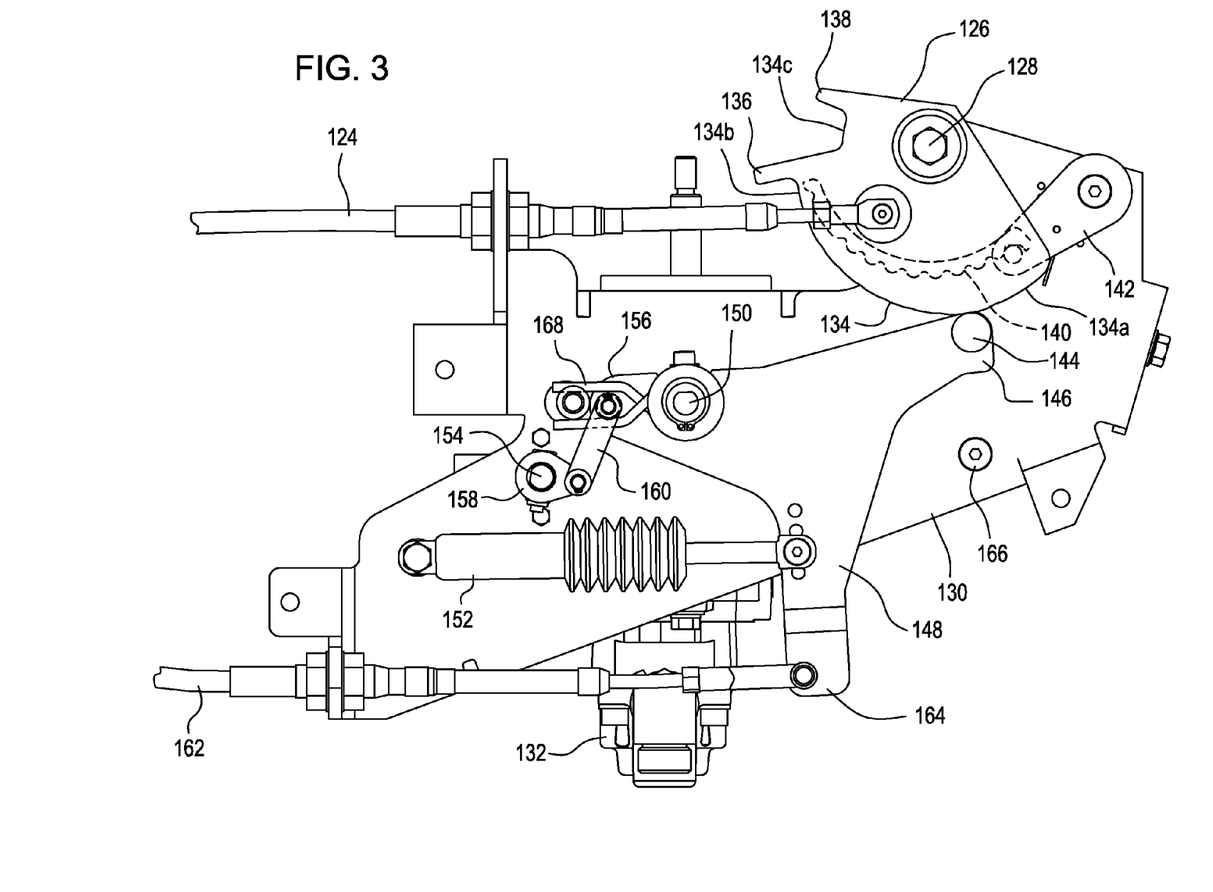
FIG. 3 is a top view of an aerator hole spacing control at a minimum coring speed position according to a first embodiment of the invention.
Figure 4:
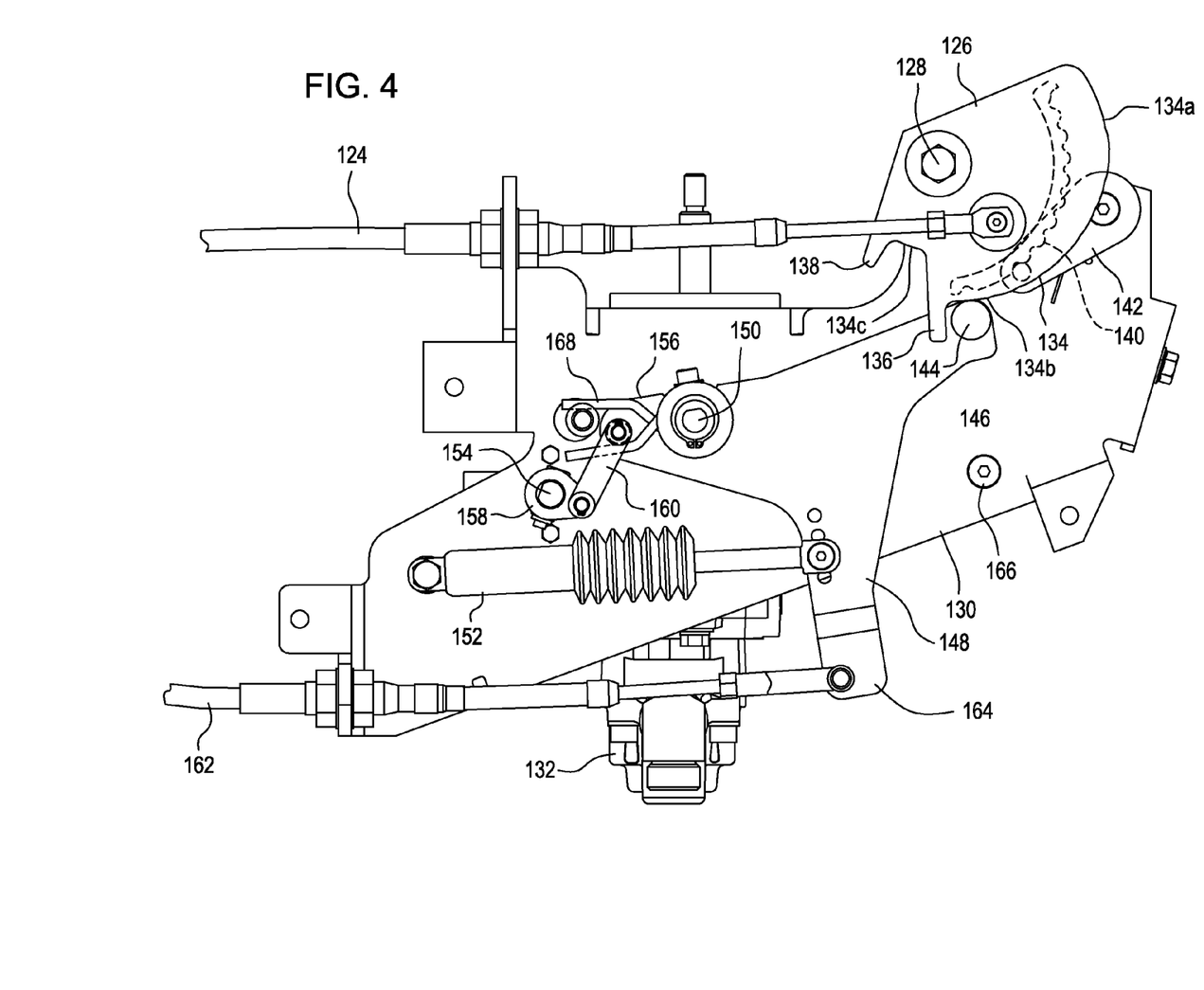
FIG. 4 is a top view of an aerator hole spacing control at a maximum coring speed position according to a first embodiment of the invention.

In one embodiment shown in FIGS. 1-2, aerator 100 includes hole spacing control 102 according to a first embodiment of the invention. The aerator frame 104 may be supported for movement over the ground by a single steerable wheel 106, which may or may not be driven, and a pair of driven wheels 108. The frame 104 may have a neck 110 extending upwardly therefrom, and the single steerable wheel may be carried in a pivotal yoke that can rotate about a vertical pivot axis attached to the neck. An upwardly and forwardly extending handle assembly 112 may be coupled to the pivotal yoke that carries the front wheel, and may include operator controls 114. An operator may walk ahead of the aerator and steer the vehicle by using the handle assembly to pivot the single steerable front wheel about the vertical pivot axis.

In one embodiment, coring head 116 may be mounted on the rear of the aerator, either behind the rear drive wheels and tires, between the rear drive wheels and tires, or adjacent the rear axle(s). The coring head may carry a plurality of tine assemblies that reciprocate up and down by rotation of a crankshaft. Each tine assembly may have a plurality of coring tines that are driven into the ground and produce holes for the purpose of aerating the turf. Each tine assembly may include a rubber dampener system that absorbs the forward motion of the aerator to help improve hole quality by minimizing hole elongation. The coring head may be raised and lowered using a hydraulic, electric or electro hydraulic lift and lower system. For example, an electric motor may power a hydraulic pump to engage a hydraulic cylinder that raises and lowers the coring head.

In one embodiment, the aerator may have an internal combustion engine supported on the frame that may be used to operate coring head 116. The internal combustion engine also may provide traction drive for the rear wheels through a mechanical transmission, or through a hydrostatic transmission with a pump to supply pressurized fluid to a single hydraulic motor or pair of hydraulic motors for rotating the rear wheels. Alternatively, the internal combustion engine may drive an alternator or generator to generate electric power for electric traction drive motors. For example, each electric traction drive motor may independently rotate each wheel. Alternatively, the aerator may use electric storage batteries or other power supplies to generate power for the coring head and/or traction drive.

In one embodiment, the operator may operate the traction drive to move the aerator forward or in reverse by moving traction bail 118 in either the forward or reverse direction. The traction bail may be a single lever or a pair of levers pivotably mounted to the sides of the operator controls on the handle assembly of the aerator. The traction bail may be biased to a central or neutral position when released by the operator.

The aerator described in this application is provided with a hydrostatic traction drive that can move the machine in the forward direction at a coring ground speed while the coring head is operating, or in the reverse direction while the coring head is not operating. Additionally, the hydrostatic traction drive can move the aerator in the forward direction at a higher transport speed while the coring head is not operating. An operator typically may walk in front of the aerator as it moves in the forward direction. However, those skilled in the art will understand that the aerator hole spacing control of this invention is not limited to aerators with the same forward and reverse designations used in this application, but are intended to include any other walk behind aerators.

In one embodiment, the operator may increase or decrease the forward or coring ground speed while the aerator is moving and the coring head is operating. Increasing or decreasing the coring ground speed of the aerator changes the hole spacing. The operator may change the coring ground speed by moving speed control lever 120 to any position between a minimum speed setting and a maximum speed setting. The speed control lever may be pivotably mounted on the operator controls 114 of aerator handle assembly 112.

In one embodiment, operator controls 114 may include speed display or dial 122 showing the forward ground speed or hole spacing of the aerator while the coring head is operating. The speed display or dial may indicate where the speed control lever is positioned along a plurality of discrete or continuously variable speed settings corresponding to hole spacing settings. For example, the speed display or dial may indicate if the speed control lever is at one of multiple hole spacing settings between a minimum of about one inch and a maximum of about four inches.

In one embodiment, as shown in FIGS. 3-6, speed control lever 120 may be connected by speed control cable 124 to speed control cam 126. The speed control cam may be pivotably mounted on pivot 128 to mounting plate 130 at or adjacent to hydrostatic pump 132. The speed control cam may have a cam surface 134 that may be smooth, or may have a plurality of shallow detents, and defines a curve that has a greater radius (spaced further from the pivot) at minimum coring speed position 134a, and a smaller radius (spaced closer to the pivot) at a maximum coring speed position 134b. Additionally, the speed control cam may have a cam surface 134c with a radius that is smaller than the maximum coring speed position, which defines a travel speed position. Cam follower 144 may contact the cam surface of the speed control cam at a location based on the position or setting of the speed control lever, between minimum coring speed position 134a shown in FIG. 3 and maximum coring speed position 134b shown in FIG. 4. Additionally, cam follower 144 may contact the cam surface at cam surface 134c which is the travel speed position. The cam follower may be any rigid or rotatable member, with or without a bearing, that may be secured to the control arm 148 so that it may follow the cam surface. The speed control cam may have a first stop or lobe 136 extending from the cam surface between the maximum coring speed position and the travel speed position, and a second stop or lobe 138 at the top end of the travel speed position.

In one embodiment, the speed control cam may have a plurality of detents on a second curved surface 140 adjacent or under the cam surface. The detents may be engaged by detent lever 142 to define multiple discrete settings for the speed control cam. For example, the detent lever may click into each detent representing ¼ inch hole spacing increments that also may be shown on the speed display or dial.

In one embodiment, cam follower 144 may follow the cam surface of the speed control cam based on the position or setting of the speed control lever. The cam follower may be attached to a first outer end 146 of pivoting member 148. For example, the pivoting member may be a control arm mounted on pump control shaft 150 which pivots to control the speed of hydrostatic pump 132 for the traction drive of the aerator, and to control whether the pump operates in forward, neutral or reverse. The pump may be connected by hydraulic lines to hydrostatic motors for each wheel. Optionally, damper 152 may be attached between the control arm and the mounting plate to help keep the cable shifting operation smooth and to prevent inertia-induced cable actuations. Alternatively, a cam surface may be provided on pivoting member or control arm 148, and a cam follower may be mounted to or provided on speed control cam 126.

In one embodiment, rotary potentiometer 154 may be mounted to mounting plate 130, and may be connected to second outer end 156 of control arm 148 by bell crank 158 and actuation lever 160. Alternatively, rotary potentiometer may be mounted above pump shaft 150 without linkages, and connected directly to the pump shaft axis. The rotary potentiometer may be electrically connected to an electronic controller, and may provide the controller with information regarding the position of the control arm. The rotary potentiometer monitors or senses the position of the pump shaft, so that the controller may know the approximate speed and direction of the aerator, and may prevent operating the coring head in certain modes such as in reverse or at transport speed.

Figure 7:
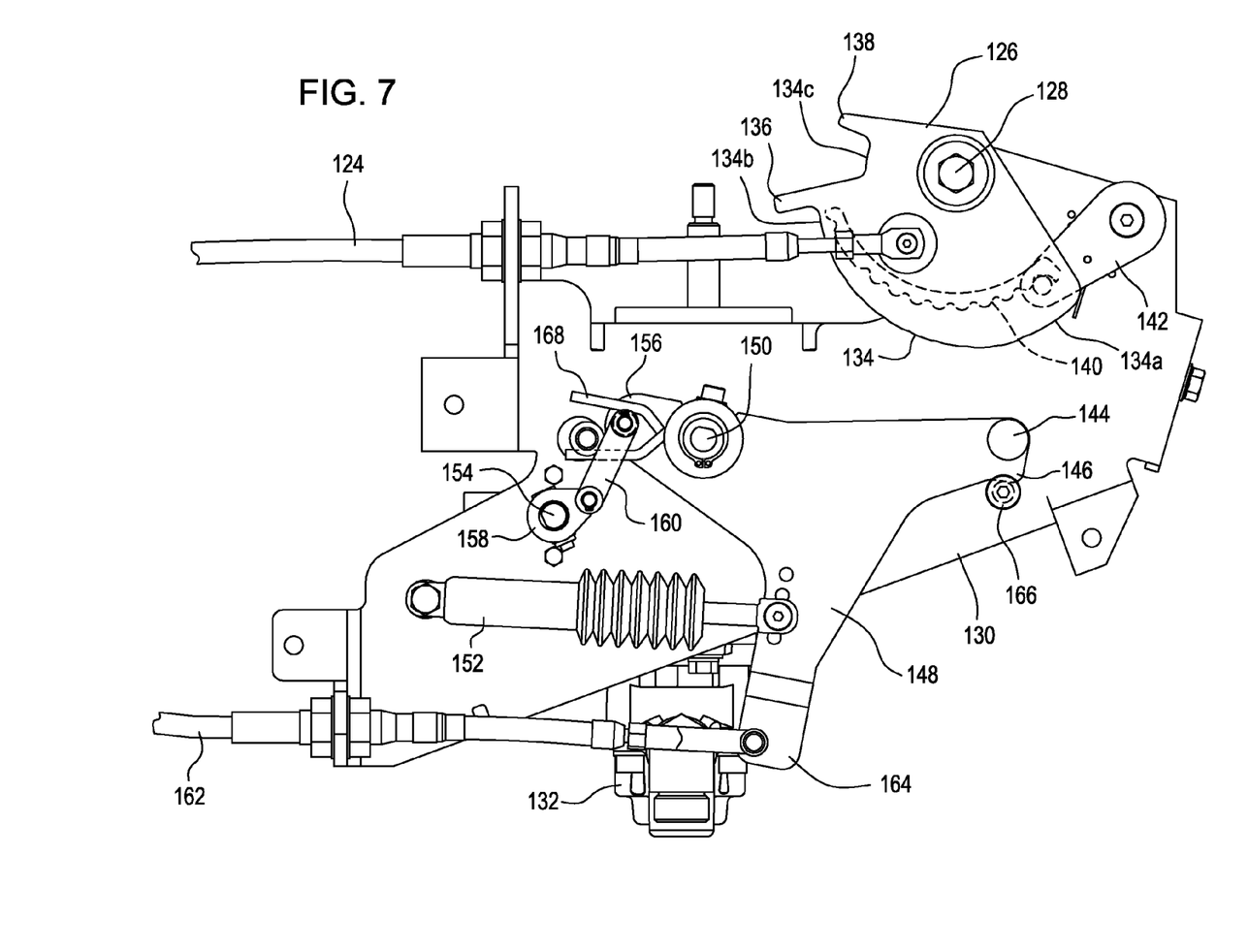
FIG. 7 is a top view of an aerator hole spacing control at a reverse position according to a first embodiment of the invention.

In one embodiment, the traction bail may be connected by traction control cable 162 to third outer end 164 of the traction control arm. If the operator puts the traction bail in the forward position, the traction control cable urges the control arm to pivot on the pump control shaft axis so that cam follower 144 is in contact with the cam surface 134 of speed control cam 126. If the operator puts the traction bail in the reverse position as shown in FIG. 7, the traction control cable urges the control cam to pivot on the pump control shaft axis until the third outer end 146 contacts a reverse direction stop. For example, reverse direction stop 166 may be on the mounting plate, or the steering column may provide a reverse stop. With the pump control shaft axis in this position, the hydrostatic pump is in reverse. Thus, if the operator puts the traction bail in the reverse position, the pump operates in reverse and the cam follower does not contact the speed control cam. Instead, the aerator may travel at a fixed reverse speed based on the position of the reverse direction stop. The reverse direction stop may be eccentric and may be rotated to adjust the fixed reverse speed.

Figure 5:
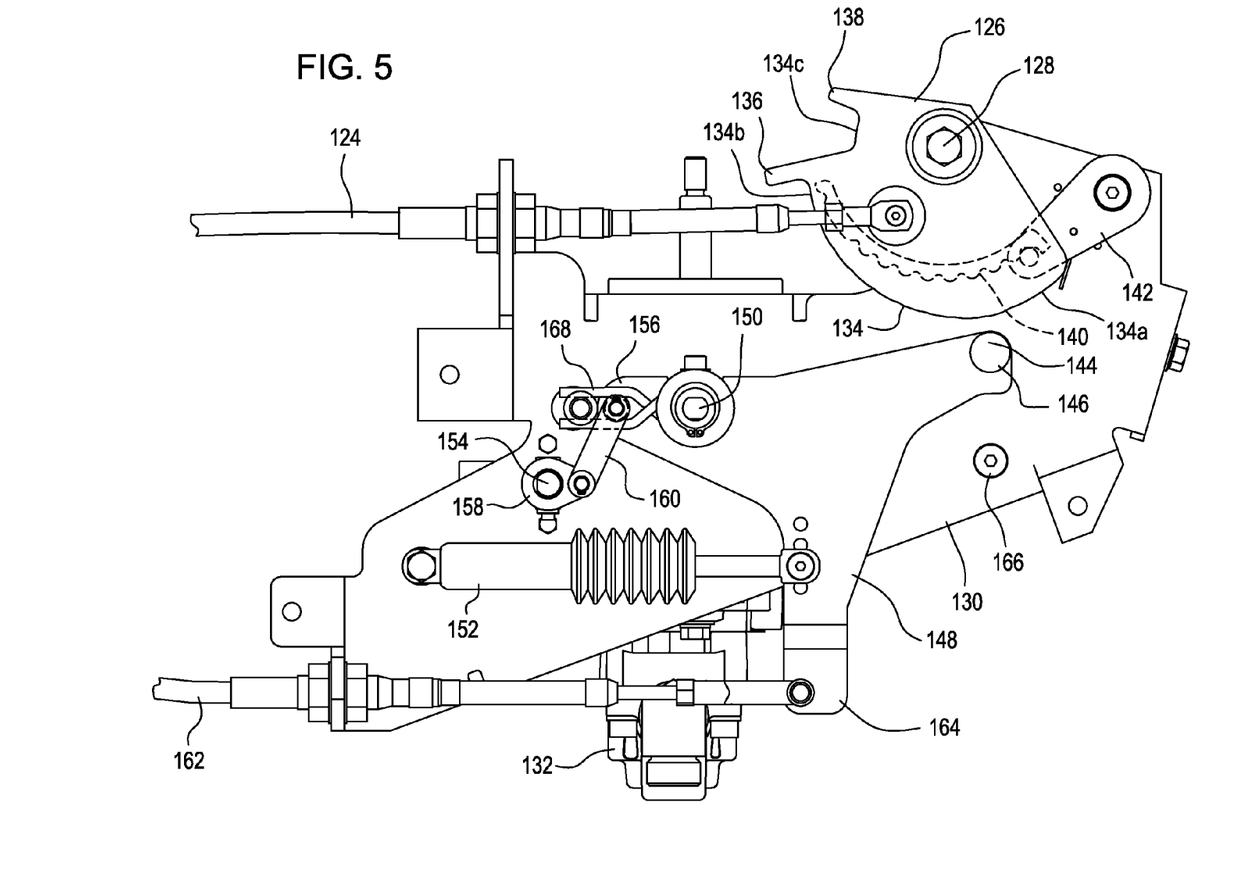
FIG. 5 is a top view of an aerator hole spacing control at a neutral position according to a first embodiment of the invention.

In one embodiment, return-to-neutral spring 168 may be fastened between the second outer end of the control arm and the mounting plate. The return-to-neutral spring may bias the control arm to the neutral position in which the pump control shaft axis and pump are in neutral. In the neutral position, as shown in FIG. 5, the cam follower does not contact the speed control cam. The traction bail also may be biased to return to the neutral position.

Figure 6:
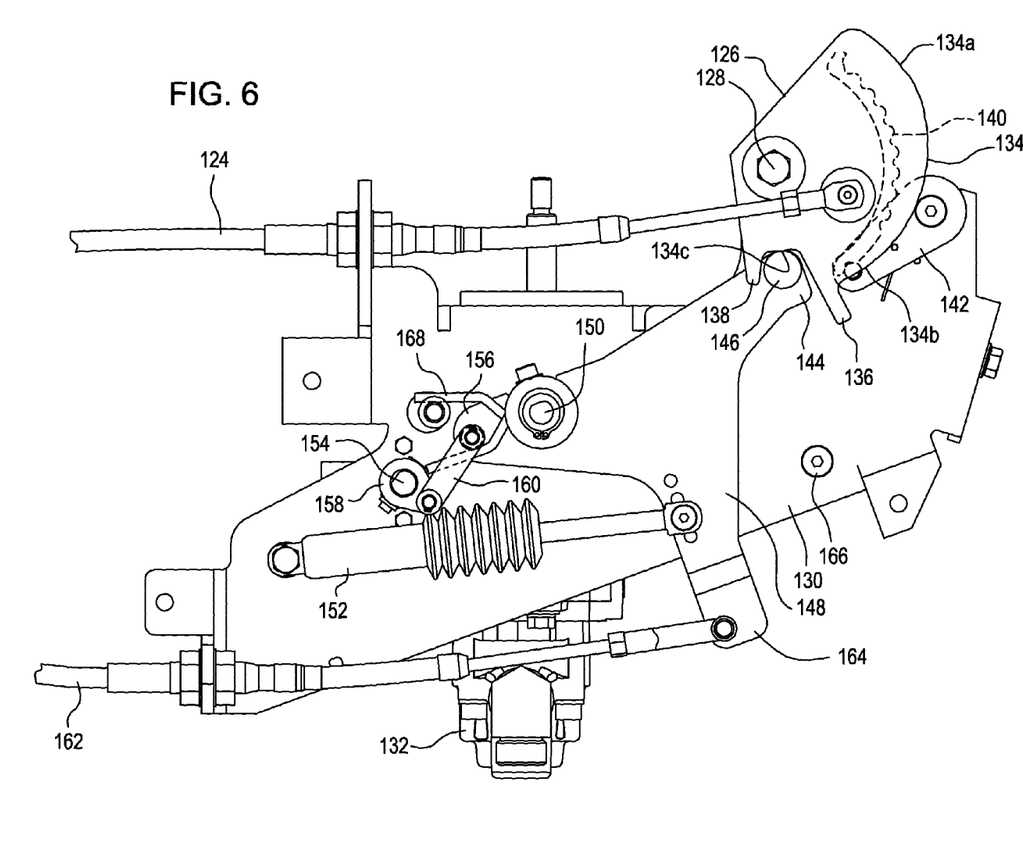
FIG. 6 is a top view of an aerator hole spacing control at a transport speed position according to a first embodiment of the invention.

In one embodiment, stop or lobe 136 prevents the operator from changing between the maximum coring speed and a higher transport speed, until he first returns the traction bail to the neutral position. Unless the traction bail is in the neutral position, the stop or lobe blocks the control arm from pivoting further on the pump control shaft to increase the pump speed. If the traction bail is in neutral, the operator then can move the speed control lever to the transport position because cam follower 144 does not contact stop or lobe 136. In the transport position, as shown in FIG. 6, the cam follower contacts the speed control cam at position 134c. Thus, the aerator may be moved at transport speed by releasing the bail so that the speed control is in neutral, before moving the speed control lever to the transport position and re-engaging the bail.

Having described the preferred embodiment, it will become apparent that various modifications can be made without departing from the scope of the invention as defined in the accompanying claims.

The invention claimed is:

1. An aerator hole spacing control, comprising:
  an aerator having a hydrostatic traction drive and at least three wheels, a neck extending therefrom with an upwardly and forwardly extending handle assembly including operator controls so that an operator may walk ahead of the aerator and steer the aerator by using the handle assembly to pivot one of the wheels about a vertical pivot axis;
  a coring head mounted on the rear of the aerator carrying a plurality of tine assemblies that reciprocate up and down by rotation of a crankshaft; each tine assembly having a plurality of coring tines that are driven into the ground and produce holes for the purpose of aerating the turf;
  an operator actuated speed control lever on the handle assembly;
  a pivoting speed control cam connected to the speed control lever and having a curved cam surface with a variable radius;
  a control arm with a cam follower and mounted to a hydrostatic pump control shaft of the traction drive;
  the control arm moving the cam follower into contact with the curved cam surface of the pivoting speed control cam and placing the hydrostatic pump in a position to operate the traction drive between a minimum coring speed and a maximum coring speed to change the hole spacing while the aerator moves forward and the coring head is operating based on where the cam follower contacts the speed control cam along the variable radius of the curved cam surface.

2. The aerator hole spacing control of claim 1 further comprising an additional cam surface on the speed control cam at one end of the curved cam surface that the cam follower contacts to operate the traction drive at a transport speed higher than the maximum coring speed.

3. The aerator hole spacing control of claim 2 further comprising a stop on the speed control cam between the curved cam surface and the additional cam surface.

4. The aerator hole spacing control of claim 1 further comprising a speed display on the handle assembly.

5. The aerator hole spacing control of claim 1 further comprising a hole spacing display on the handle assembly.

6. The aerator hole spacing control of claim 1 further comprising a plurality of detents on a second surface of the speed control cam adjacent the curved cam surface.

7. An aerator hole spacing control, comprising:
  a hydrostatic traction drive including a pump and a plurality of wheel motors;
  a coring head having a plurality of reciprocating tines;
  a control arm mounted on a control shaft of the pump that controls the direction and the speed of the pump;
  a cam follower on the control arm that contacts a curved cam surface having a minimum coring speed position, a maximum coring speed position, and a transport position;
  the cam surface linked to an operator speed control that moves the curved cam surface to determine where the cam follower contacts the curved cam surface to change the speed of the pump anywhere between the minimum coring speed position and the maximum coring speed position without stopping the pump.

8. The aerator hole spacing control of claim 7 wherein the minimum coring speed position of the curved cam surface has a larger radius than the maximum speed position of the curved cam surface.

9. The aerator hole spacing control of claim 7 wherein the transport position of the curved cam surface has a smaller radius than the maximum speed position of the curved cam surface.

10. The aerator hole spacing control of claim 7 wherein the control arm moves out of contact with the curved cam surface to operate the pump in reverse.

11. An aerator hole spacing control, comprising:
  a traction drive including at least a pair of driven wheels and a single steered wheel;
  a coring head having a plurality of reciprocating tines;
  an operator-adjustable speed control connected by a speed control cable to a pivoting member; and
  a cam follower contacting a curved surface of the pivoting member to run the traction drive at any forward speed between a minimum coring speed and a maximum coring speed depending on the setting of the pivoting member, or being out of contact with the curved surface of the pivoting member to operate the traction drive in neutral or reverse.

12. The aerator hole spacing control of claim 11, wherein the cam follower is on a control arm connected by a traction control cable to a traction bail.

13. The aerator hole spacing control of claim 12, wherein the control arm is mounted to a pump control shaft of a hydrostatic traction drive.

14. The aerator hole spacing control of claim 11, further comprising a potentiometer sensing the position of a pump shaft for the traction drive.

15. The aerator hole spacing control of claim 11, further comprising a plurality of detents adjacent the curved surface of the pivoting member.

16. The aerator hole spacing control of claim 11, wherein the cam follower is biased to operate the traction drive in neutral.

\* \* \* \* \*